UNITED STATES PATENT OFFICE.

WINFIELD SCOTT MORRISON, OF SAN FRANCISCO, CALIFORNIA.

DENTIFRICE.

947,120.  Specification of Letters Patent.  Patented Jan. 18, 1910.

No Drawing.  Application filed April 5, 1906. Serial No. 310,116.

*To all whom it may concern:*

Be it known that I, WINFIELD SCOTT MORRISON, a citizen of the United States, residing at San Francisco, in the county of San Francisco and State of California, have invented a new and useful Dentifrice, of which the following is a specification.

The present invention aims to disclose a novel base for tooth paste.

Ordinarily tooth pastes are compounded with glycerin, glucose, syrup, honey, glycerite of starch, or other similar saccharine substances as a base. These substances in large quantities are without doubt harmful especially where carious conditions exist. Such a base, further serves only the function of a vehicle and possesses no further advantages.

It is therefore the object of the present invention to disclose a base for a tooth paste which base will present such characteristics as will render it extremely desirable and suitable as a base or vehicle for the abrading ingredients of the paste and will at the same time produce beneficial results in a physiological sense.

To the attainment of the ends above mentioned, the invention contemplates the employment, as a base for a tooth paste, a concentrated magma of hydrated magnesium oxid, in conjunction with calcium carbonate, magnesium carbonate and glycerin.

The concentrated magma of hydrated magnesium oxid as stated above is obtained in the following manner: A solution of a salt of magnesium is boiled for a specified time and to it is added a caustic alkali whereby the magnesium will be precipitated as a hydrated oxid. The product is then alternately agitated, boiled and allowed to settle whereby the reduction of the particles of the magnesium hydroxid is effected. At the same time all traces of the salt in solution resulting from the reaction are removed by decanting, and the product further, is strained, and finally concentrated by drying with frequent agitations to prevent the formation of crust and granular lumps. The concentrated product thus obtained has a specific gravity of 1.10 and contains about 20 per cent. of magnesium hydroxid and the individual particles of the hydroxid measure between 1/5000 and 1/10000 of an inch in diameter. To this product having the above characteristics is added calcium carbonate and magnesium carbonate in about the proportion of 7¼ pounds of the former and 5 pounds of the latter to 24 pounds of the product. To this mixture is then added 30 fluid ounces of glycerin, 160 grains of sodium saccharate, 40 grains of eosin, and 4 fluid ounces of flavoring material of which oil of cassia forms 30 per cent., and oil of cloves 20 per cent., oil of rose 20 per cent., and menthol 30 per cent.

The alkaline base compounded as above described possesses the quality of neutralizing the acids which often develop when the dentin is exposed or where carious conditions exist, while the antiseptic properties of the menthol and oil of cloves will have a tendency to allay any pain or ache and also to harden the gums. The antiseptic properties of the menthol and oil of cloves in conjunction with the neutralizing and cleaning effect of the magnesium hydroxid, magnesium carbonate and calcium carbonate, effectually destroys any deposits or other foreign matter adhering to the teeth.

The concentrated magma is in the form of an unctuous mass, moist and plastic, and of substantially uniform grain and devoid of grittiness, and the magnesium carbonate and calcium carbonate are held in suspension in the magma owing to the condition to which it has been reduced by the process heretofore described.

What is claimed is:—

As a base for a tooth paste, concentrated magma of magnesium hydroxid from which all trace of the precipitant has been removed and which is in the form of an unctuous mass, moist, and plastic, of substantially uniform grain and devoid of grittiness, the specific gravity of which is about 1.10 and the individual particles of which measure from 1/5000 to 1/10000 of an inch in diameter and calcium carbonate and magnesium carbonate held in suspension in said magma, and glycerin.

In testimony that I claim the foregoing as my own, I have hereto affixed my signature in the presence of two witnesses.

WINFIELD SCOTT MORRISON.

Witnesses:
W. W. WORDEN,
PURCELL ROWE.